United States Patent
Rehme et al.

[15] 3,651,303
[45] Mar. 21, 1972

[54] METHOD AND APPARATUS FOR TREATING OBJECTS IN A CORPUSCULAR RAY DEVICE

[72] Inventors: Hans Rehme, Munich; Kurt Tögel, Karlsruhe, both of Germany

[73] Assignee: Siemens Aktiengesellschaft, Berlin, Germany

[22] Filed: Oct. 20, 1969

[21] Appl. No.: 867,781

[30] Foreign Application Priority Data

Oct. 18, 1968 Germany ............... P 18 04 646.3

[52] U.S. Cl. .................................. 219/121 EB, 219/121 EA
[51] Int. Cl. ............................................. B23k 9/00
[58] Field of Search .............. 219/121, 121 EB; 250/49.5, 250/41.9

[56] References Cited

UNITED STATES PATENTS

| | | | |
|---|---|---|---|
| Re.27,005 | 12/1970 | Wingfield et al. | 219/121 |
| 3,491,236 | 1/1970 | Newberry | 250/495 |
| 3,519,788 | 7/1970 | Hatzakis | 219/121 |
| 3,140,379 | 7/1964 | Schleich et al. | 219/69 |
| 3,196,246 | 7/1965 | El-Kareh | 219/69 |
| 3,151,231 | 9/1964 | Steigerwald | 219/121 |
| 3,301,949 | 1/1967 | Ullery | 219/121 |
| 3,308,264 | 3/1907 | Ullery | 219/121 |
| 3,326,176 | 6/1967 | Sibley | 118/6 |

*Primary Examiner*—R. F. Staubly
*Assistant Examiner*—Gale R. Peterson
*Attorney*—Curt M. Avery, Arthur E. Wilfond, Herbert L. Lerner and Daniel J. Tick

[57] ABSTRACT

A method and apparatus for treating objects in a corpuscular ray device. A beam source provides a beam of corpuscular rays. This beam is focused at the object plane and coils coact with the beam to deflect the latter. A table supports the object at the object plane and this table is adjustable transversely with respect to the beam. The accuracy with which the table is constructed and adjusted is only sufficient to achieve a course adjustment of the object with respect to the treating beam. On the other hand, the deflecting coils deflect the beam with respect to the object which has been coarsely adjusted so as to achieve in this way a highly precise fine adjustment of the beam with respect to the object.

14 Claims, 7 Drawing Figures

METHOD AND APPARATUS FOR TREATING OBJECTS IN A CORPUSCULAR RAY DEVICE

The present invention relates to corpuscular ray or particle-beam devices for treating objects with a beam of corpuscular rays provided from a suitable source. A table which carries the object to be treated shifts the object transversely with respect to the beam during adjustment of the table, while between the beam source and the table there are a focusing device for focusing the beam and a deflecting device for deflecting the beam. A device of this general type is disclosed in Fr. Pat. No. 1,215,825.

Our invention is to be understood as applying to corpuscular ray devices which in general are capable of providing a physical or chemical change on the material of the object which is treated by the beam of charge carriers such as electrons or ions. The treatments may be boring, cutting, melting, welding, and in addition such treatments as vaporizing, atomizing, etching, doping, oxidizing, reducing, etc.

Devices of this type are of particular importance in the field of manufacture of microminiature electrical components. Thus, such devices are of particular significance in the manufacture of integrated circuits or for the manufacture of thin-film components. For example it is possible with devices of this type to manufacture transistors.

In carrying out treatments of the above type, it is essential that the region of the object which is to be treated have a precisely determined position with respect to the corpuscular treating ray or beam. In addition, the device must be built in such a way that it is possible to treat in the desired manner relatively large object regions on the order of, for example, a region having a diameter of 50 mm. Thus, it is not essential to manufacture only a single "system," such as, for example, a single electrical circuit on the region of the object which is treated, but instead it is important to be able to manufacture a multiplicity of identical systems.

It is known to carry out manufacturing devices of this type either according to an integrated beam method where a stencil-type of mask is imaged at a reduced scale on the treated object region by means of the beam, or it is possible to use a raster-type of scanning according to which the region of the object which is to be treated is swept over or scanned by the corpuscular ray beam according to a predetermined program. Both of these treatment methods may, however, be combined in that a mask is used while the individual regions of the mask are scanned by a highly intensified beam and thus sequentially imaged on the object.

In all of the above cases it is required that initially an accurate orientation between the surface of the object to be treated and the corpuscular ray beam be provided. In principle such an orientation is possible by way of an adjustable table which carries the object and which can be adjusted in a pair of mutually perpendicular directions, provided that the table is manufactured with extremely small tolerances. However, the manufacture of such an extremely accurate table is very expensive particularly in the case where relatively large areas of the object are to be treated. Thus, in this event it is essential to provide the table with the possibility of carrying out extremely accurate movements within a large range.

Another principal solution to the problem can be achieved by adjusting, not the object relative to the beam, but rather the beam relative to the object, so that a deflection of the beam or an enlargement of the cross section thereof is required. However, known imaging errors of corpuscular ray optical systems stand in the way of such a solution to the problem. Thus, because of primary errors in corpuscular ray optical lenses it is not possible to provide in the object plane a cross section of the beam which is of any desired size. Because of known deflection astigmatism of a deflected corpuscular ray beam, the magnitude of the angular deflection must be maintained within values which are not sufficient for the adjustment of the relative position between the region of the object which is to be treated and the ray of charge-carriers.

It is accordingly a primary object of our invention to provide a method and apparatus which will avoid the above drawbacks.

In particular, it is an object of our invention to provide for a device of the above type an object-supporting table which need only be manufactured with moderate accuracy while at the same time achieving the possibility of precise, highly accurate, fine adjustments between the object and the treating beam even when the adjustments are required to be carried out over a relatively large region.

Yet another object of our invention is to provide a method and apparatus which make it possible to achieve highly precise positioning of an object during sequential treatments thereof with the positioning of the object at each treatment corresponding very precisely to its position at the other treatment.

Furthermore, it is an object of our invention to provide a method and apparatus which make it possible to simultaneously treat a plurality of objects at a plurality of stations to which the objects are sequentially moved.

It is furthermore an object of our invention to provide a method and apparatus which is capable of achieving the desired treatment of the objects in a manner which is relatively inexpensive when the particular treatment of the objects and the output are taken into consideration.

In accordance with our invention the problems heretofore encountered are avoided by carrying out with a table which carries the object coarse adjustments of the object with respect to the treating beam while fine adjustments are carried out by deflecting the beam with respect to the coarsely adjusted objects. The extent of the coarseness of the adjustment made by way of the table is such that unacceptable imaging errors at the treating area of the beam in the object plane are avoided.

Thus, with our invention, the combination of the above features makes it possible to provide an object-supporting table of only moderate accuracy which can be moved transversely to the beam in mutually perpendicular directions while at the same time avoiding imaging errors which are known to be encountered by a large degree of deflection of a beam by a deflecting means having the form, for example, of deflecting coils or deflecting plates.

The treating area is to be considered when the treatment is carried out with an integrated beam as the cross section of the beam in the object plane, while in the case of a raster-type of scanning with the treating beam, the treating area is to be considered as the area of the object which is swept over by the beam at the particular coarse adjustment of the table with the beam influenced by the deflecting means. Thus, the device and method of our invention provide in the case of an integrated beam a deflecting means capable of deflecting the corpuscular ray beam so as to achieve the fine adjustment.

In accordance with our invention, the object which is treated is to be considered not only as an electrical component but also as an element in the form of a mask which provides with the beam a stencil for subsequently achieving, in particular with corpuscular ray treatments, the manufacture of systems on other objects at a reduced scale. Such masks are already known as so-called photomasks on which the systems to be later transferred to the objects themselves are imaged at reduced scale in a photographic manner. With the method and apparatus of our invention the manufacture of such masks is carried out according to a corpuscular ray optical method, thus making it possible to take advantage of the corpuscular ray optical imaging. The advantages which can be achieved in this way are a lesser degree of imaging errors and a greater focal depth.

Initially, the case of using a single beam for providing sequentially several systems on different object regions can be considered. In this event it is possible to treat different regions of the same object or different objects. In this way the sequentially treated regions are provided with systems which are as identical as possible. With our invention it is possible to provide adjustment of the object coarsely by way of the table which carries the object in such a way as to achieve sequential manufacture of several systems on different regions of the same object with the coarse adjustment being such that any unacceptable differences between the manufacture of the different systems are avoided as a result of the deflection of the treating beam to achieve the fine adjustment. In this case also the coarse adjustment is carried out with an accuracy which will avoid during fine adjustment any unacceptable imaging errors in the sense of an unacceptable difference between the several systems.

In the manufacture of individual systems as well as in the manufacture of several systems it is possible if necessary to manufacture the individual systems in several treating operations with a plurality of beam sources being provided to achieve the several corpuscular ray beams to provide the individual treatments. In order to make the best possible use of the relatively complex and expensive apparatus, all the beams will be respectively directed to the same object regions, so that the several different systems will be simultaneously manufactured during the sequential treatment steps which are simultaneously carried out. For such an arrangement it is desired to provide a coarse adjustment of an object by way of the several beams during a sequential movement of the object to several operating stations with the extent of coarse adjustment being such that any unacceptable differences between the treated object areas and the different beams are avoided by way of the fine adjustments achieved through a deflection of the beams. For this purpose reference values are provided in the form of the theoretically desired configuration of the treated object area.

In accordance with our invention it is possible to detect the extent to which the coarse adjustment deviates from the desired exact location, and this detection provides a signal for carrying out the fine adjustment.

In a case where the individual treatments are carried out sequentially on individual object regions, the first treatment will involve providing each object with predetermined reference marks by changing the location of the upper surface of the object with respect to the beam. Then after the coarse adjustment the location of the reference marks for the remaining treating operations is detected by suitable detectors which achieve in this way a criterion for the fine adjustment. These reference marks can be manufactured in the most widely different ways, for example by localized generation, removal, or changing of surface layers of the object as by contamination, oxidation, reduction, vaporizing, or the like. In this way it is possible to achieve different return stray coefficients of particles such as electrons, for example, which impinge on the object to provide a discharge of secondary electrons, or to provide differences in the spectral composition of characteristic Rontgen or fluorescent rays. Of course, it is to be understood that the localized changes in the exterior surface of the object are so great that measurable differences in the relationships between these regions of the object surface with respect to other regions thereof are provided.

It is of course possible to achieve from such signals a change in the excitation of the beam-deflecting means to bring about the required fine adjustment. It is particularly suitable, however, to connect the output signals of the detectors with the current supply circuit which coacts with the deflecting means so as to achieve in this way an automatic fine adjustment. In the case where more than one reference mark is provided by the treating beam at the first operating station, it is possible to provide detectors which give signals in accordance with the lateral and angular positions of the reference marks after coarse adjustment for the subsequent treating operations. In this way it is possible also to take into consideration any angular movement of the object. It is possible to achieve with the first treating ray several reference marks which influence a detector in such a way that the amplitude of the deflection is controlled by the corresponding signal. Thus it may be desirable to determine automatically the amplitude of deflection of the individual beams and to correct this amplitude of deflection so as to correct the scale of magnification or reduction, and in this way to assure the fact that at all operating stages there is a complete matching of the location of the system.

While control of the coarse adjustment during individual manufacture is referred to above, it is also possible to provide a corresponding form of the method and apparatus of our invention for the case of assembly-line manufacture by providing a plurality of treating beams situated beside each other for achieving sequential operations on objects which are moved from one operation station to the next while several treating operations are simultaneously carried out with simultaneous exposure of the objects to the treating beams to provide an assembly-line type of manufacture. In this case the table will carry the plurality of objects which are treated simultaneously with these objects arranged at uniform distances from each other and the coarse adjustments are simultaneously carried out by simultaneous movement of all of the objects through a distance corresponding to the distance between the successive objects. Each of the objects will have reference marks so that in accordance with the location of the reference marks detected by the detecting means after coarse adjustment it is possible to achieve a criterion for the fine adjustment of the particular treating beam by corresponding excitation of the beam-deflecting means.

Thus, for example, during the first operation reference marks are provided on the object so that during the subsequent coarse adjustments these marks can be scanned at the next operating stations. In accordance with the scanning by the subsequent treating beams it is possible to achieve signals for carrying out the required fine adjustment of the individual treating beams.

A special case is the manufacture of individual systems on a plurality of masks of a set of masks. Such a set of masks are used, for example, in the case where an object is to be treated sequentially at several treating stations. For this purpose it is required that the position of the individual systems at each mask of the set be very accurately maintained. For this purpose a reference object will be used as a reference mark which will control all of the masks of the set. In the case where the manufacture of each mask calls only for a single treating operation, the masks can be simultaneously manufactured by parallel treatments without any reference marks if they are arranged in common on the same table and the deflecting means for the individual beams are coupled with each other in a suitable manner.

Our invention is illustrated by way of example in the accompanying drawings which form part of this application and in which.

Figure 1:
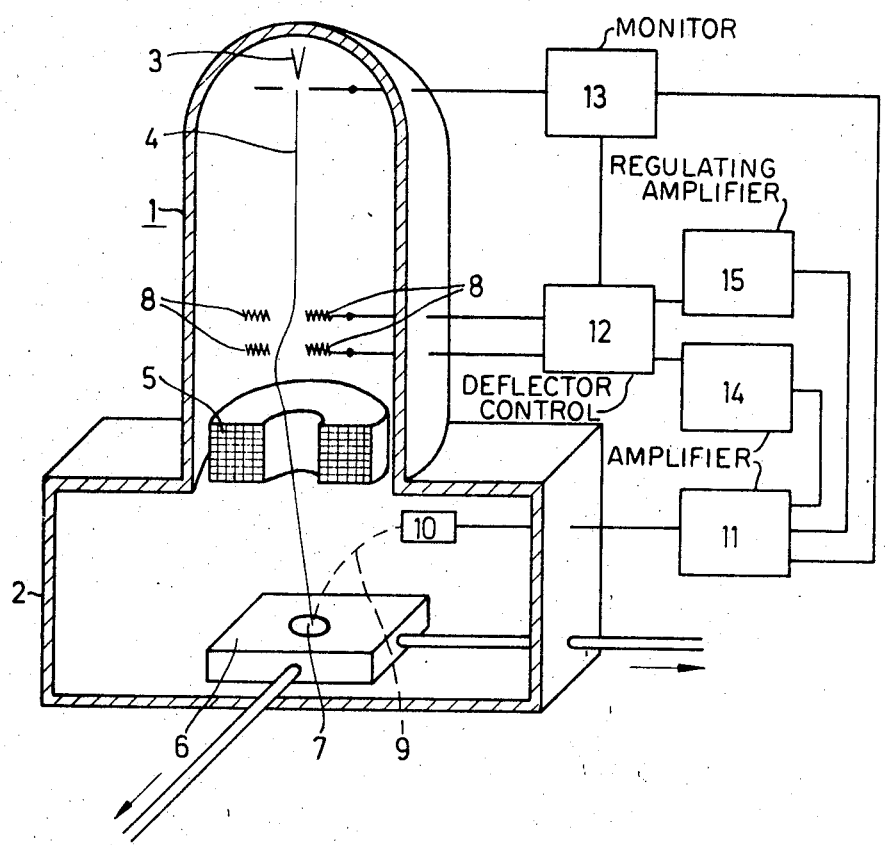
FIG. 1 is a partly sectional schematic elevation of a method and apparatus for the individual manufacture of a single object.

Referring now to FIG. 1, there is illustrated therein an evacuated housing 1 of the corpuscular ray device. The housing has a lower evacuated region 2 which forms the object chamber of the housing. A beam source 3 emits the corpuscular ray beam 4 such as, for example, an electron beam. This beam travels, after being concentrated, through the electromagnetic lens 5 so as to reach the object 7 which is carried by the table means 6. Between the beam source 3 and the focusing lens 5 there are in the illustrated example coils 8 which form a deflecting means for the beam 4. The object-carrying table means 6 is capable of being adjusted in mutually perpendicular directions, as indicated by the arrows, through drives which in the known way extend in a vacuum-tight manner through the walls of the housing 1 into the evacuated interior of the chamber 2 thereof.

In order to be able to manufacture the table 6 with moderate, conventional accuracy even through the region of the object 7 which is to be treated must be situated with extremely great accuracy with respect to the impinging treatment beam 4, this table means 6 is designed only to carry out coarse adjustment of the position of the object 7, while fine adjustment of the relative positions of the beam and the object is brought about by the corresponding excitation of the deflecting coils 8. The table means is shiftable for coarsely adjusting the relative positions of the beam and object to such a degree of accuracy that the deflection of the beam by the deflecting coils is less than a given maximum at which unacceptable imaging errors occur. These deflecting coils are utilized irrespective of whether the treatment is carried out by way of an integrated beam or by way of a raster-type scanning operation according to which the beam sweeps over the area to be treated. In order, for example, to have a criterion for carrying out the different treatment operations either in the same device or in different devices, the method and apparatus of our invention will provide for the objects after the coarse adjustment thereof by way of the table means 6 the same relative position between the object 7 and the beam 4 as prevailed during the other preceding treatment operations. For this purpose the first treatment involves providing reference marks on the object 7 by way of the treating beam. At the beginning of each of the subsequent treatment operations the beam will scan the object and the reflected ray 9 will be detected by a detector means 10 which thus scans the object to detect the position of the reference marks thereof. With the arrangement shown in FIG. 1 the object carries a plurality of reference marks whose signals after passing the amplifier 11 are directed partly to the current supply device 12 which is operatively connected with the coils 8 to control the extent of deflection achieved thereby and partly to the monitor 13. The signals resulting from the position of the reference marks after coarse adjustment are transmitted through the control amplifier 14 to the current supply or deflector control unit 12 while the control amplifier 13 receives the signal for amplitude correction (scale correction) of the deflection of the beam 4. With integrated imaging a corresponding correction of the scale of reduction in the imaging, for example, is brought about by corresponding influence of the excitation of the imaging lenses.

A device for assembly-line type of manufacture can be brought about by providing a plurality of beam systems as illustrated in FIG. 1 with the several systems situated, however, in a common evacuated housing. Then the objects can be carried by a common supporting table which is movable in mutually perpendicular directions. Each object during the first treating operation is provided with reference marks which are scanned during each of the subsequent treatment operations to provide the fine adjustment of the individual beam systems. The treatment of the objects by the different beams can take place in synchronism, for example by a common monitor control for all of the beam systems.

Figure 2:
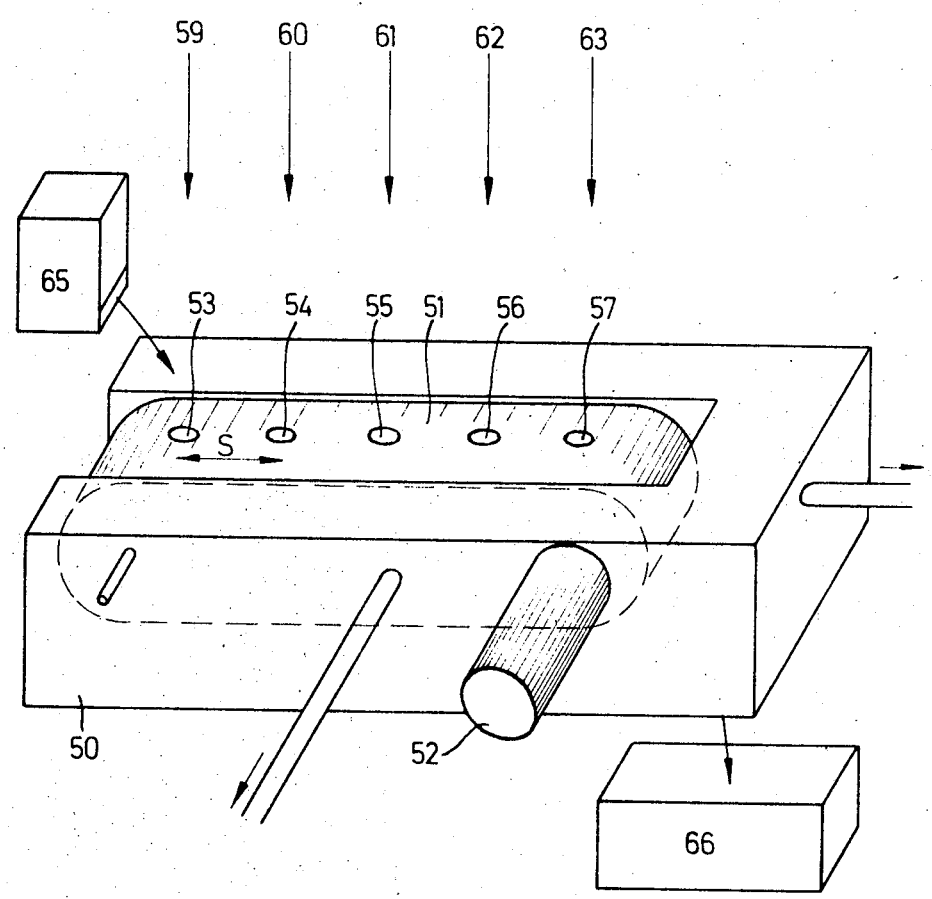
FIG. 2 is a schematic representation of a table used in the manufacture according to an assembly-line technique.

FIG. 2 shows a table means which is adjustable in a pair of mutually perpendicular directions and which serve to support the objects, in a manner according to which an assembly-line type of operation can be carried out. Thus, it is to be assumed that a plurality of systems are to be manufactured on each object. The table primarily includes a frame-like component 50 which is capable of being moved by way of mechanical means of moderate accuracy in both of the mutually perpendicular directions indicated by the arrows to bring about the coarse adjustment. In addition the table means 50 includes an endless belt 51 supported for movement by end rollers for the purpose of transporting the several objects sequentially to the several treating locations. One of the belt rollers is operatively connected to and driven by a motor 52 which is controlled by the monitor according to a given program. The belt 51 carries in the illustrated example five objects 53-57 which are to be treated, these objects of course being provided with their reference marks. Thus, there are five beams 59-63 which will carry out the sequential treating operations. The table means 50 is moved for each object position in accordance with the number and arrangement of the systems of each object.

It is thus apparent that the individual objects 53-57 which are to be treated are situated at the same distance $s$ from each other on the belt 51. To change the positions of the objects they are all transported through the same increment $s$, while the individual transporting movements can deviate from each other by small amounts $\Delta s$. In order to be able to compensate for such deviations, the beam 59 will during the first treating operation, where the object 53 is treated in the position illustrated in the drawing, provide individual reference marks. These marks will, upon subsequent position changing when the object 53 moves sequentially to the positions occupied by the objects 54-57 in FIG. 2, control the deflection of the beams 60-63 during the further treating operations.

If it is also desired to provide adjustments compensating for lack of accuracy in the individual beam systems, for example by charging, then for each object several reference marks are required.

The unit 65 is a container which holds a supply of the objects while the receptacle 66 receives the finished objects. The latter fall out of the corresponding recesses or openings formed in the belt 51 for supporting the objects therein. As soon as an object reaches the right belt-supporting roller it will simply fall off the opening into the collecting receptacle 66.

Figure 3:
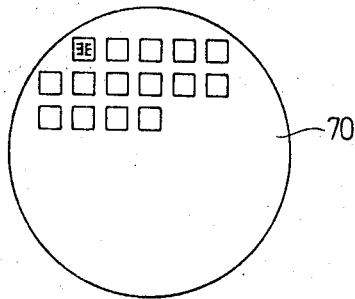
FIGS. 3–5 show on an enlarged scale the object areas which are treated.

FIG. 3 illustrates the concept of the invention with respect to an object 70 which is treated according to the method and apparatus of our invention to have a plurality of individual systems.

Figure 4:
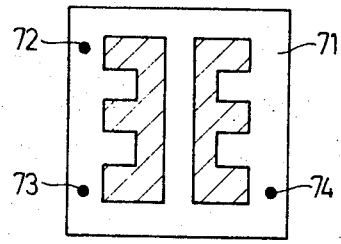

One of these individual systems 71 is shown at an enlarged scale in FIG. 4. This system 71 is provided during the first treatment operation with three reference marks 72, 73 and 74 which in the above-described manner provide a criterion serving to determine the particular position of this region of the object with respect to the treating ray as result of the coarse adjustment, and in addition these reference marks provide a correction of the deflection amplitude of the ray during raster-type of treatment or of the imaging scale during treatment with an integrated beam. These results can be achieved by the time delay of signals derived from the reference marks during raster-type of scanning, with the latter signals being compared with a reference value supplied to the monitor. Thus, where the frequency is constant time delays which are too small indicate that the deflection amplitude is too large.

Figure 5:
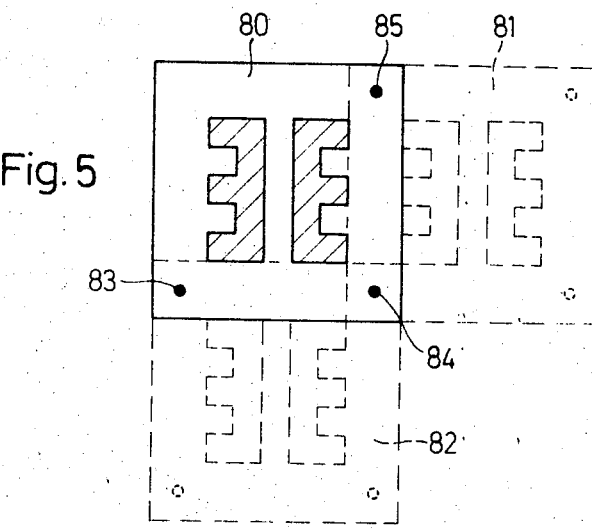

FIG. 5 shows use of similar principles for correcting the position during the manufacture of neighboring systems 80, 81, and 82. During manufacture of the first system 80 three reference marks 83-85 are provided, and after coarse adjustment the fine adjustment is carried out by beam deflection in such a way that the reference marks send out during raster-type of scanning signals at predetermined time intervals. Corresponding reference marks are provided during the manufacture of the additional systems.

Figure 6:
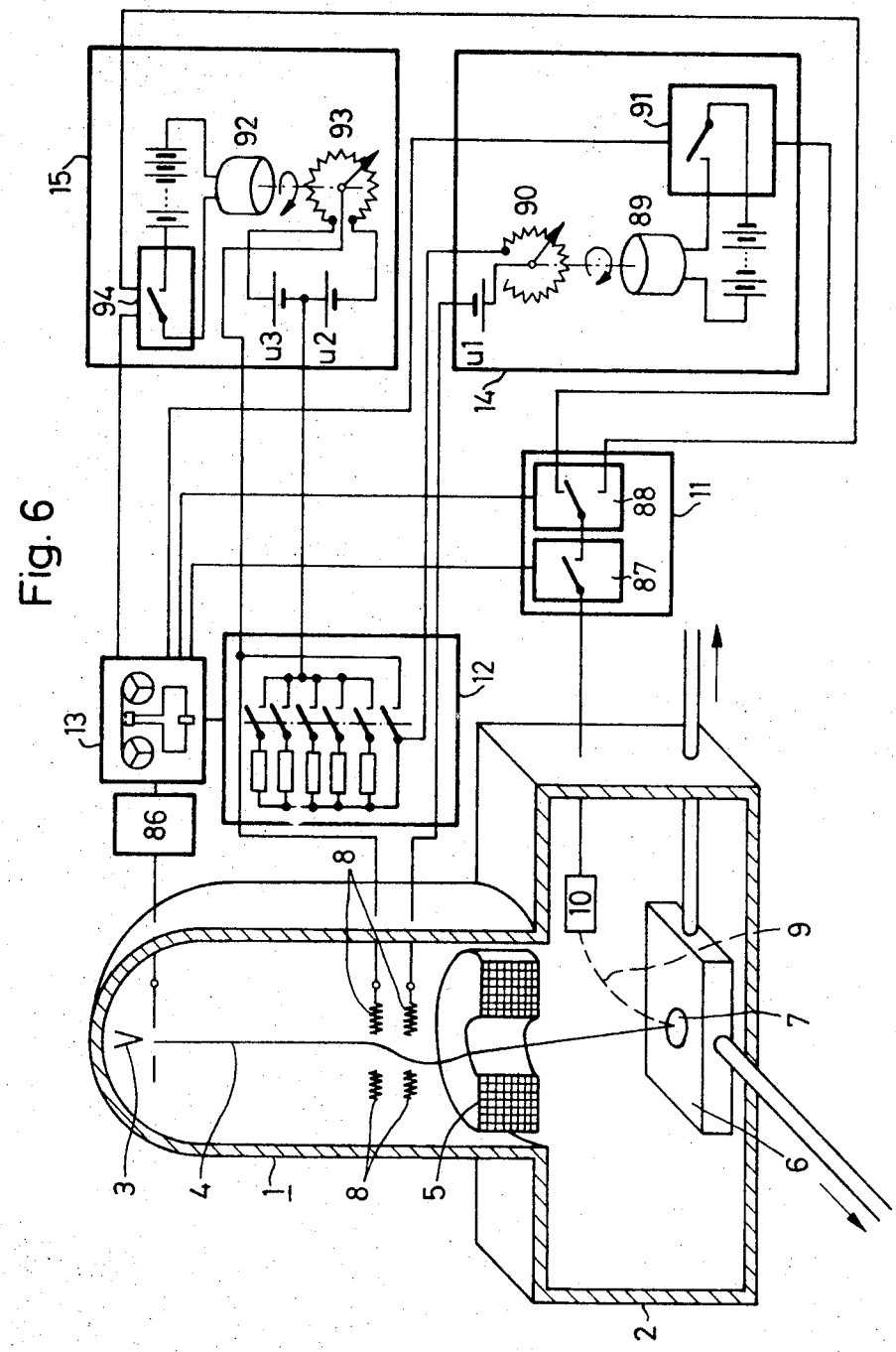
FIG. 6 is a detailed schematic diagram of the method and apparatus of the invention according to FIG. 1.

FIG. 6 depicts details of the device according to the invention disclosed in FIG. 1 and corresponding parts are designated by like reference numerals. Again, the electron gun is depicted by the cathode 3. Such electron guns for corpuscular ray apparatus are known in the art of which the one disclosed in U.S. Pat. No. 3,191,028 is typical. Also known are the deflection systems, for example, the deflection system illustrated in FIG. 4 of Fr. Pat. No. 1,215,825.

After the coarse adjustment is effected through movements of the specimen 7, by shifting the specimen table 6, a command is issued to the programming device 13. This command can be given automatically, following the coarse adjustment or it can be effected manually.

For the embodiment illustrated in FIG. 6, it is assumed that the program is stored on a magnetic tape, the latter being provided with a plurality of traces each of which contains commands. The traces are mutually parallel and run in the direction of the tape. Accordingly, device 13 is a tape transmitting device containing a plurality of magnetic reading heads provided for the respective traces on the tape and arranged in adjacent parallel configuration perpendicular to the direction of the tape movement. These magnetic reading heads have respective coils in whose circuits flow currents that correspond to the signals stored in the respective traces of the magnetic tape. The circuit of each coil provided for the various magnetic heads contains a sensitive relay which has a contact. As will be explained later, the contacts are situated in devices 11, 12, 14 or 15. There are also contacts in the ancillary device 86 which controls the corpuscular ray beam.

As soon as the shifting of the table causes the device 13 to receive the starting command, following the coarse adjustment, its various relays close by means of specified contacts in response to appropriate commands that are stored on the various traces of the magnetic tape. This action is connected with device 86 which has the task of controlling the electron beam emitted by the electron gun 3 with regard to intensity and pulses. The circuit arrangement of device 86 is known, for example, from the above-mentioned French Patent; this circuit arrangement comprises a mono-stable flip-flop unit which determines the intensity of the output current or the magnitude of the output voltage as well as a circuit which influences the time constant of the tripping process; these circuits have resistances with corresponding contacts so arranged that the resistances can be made to function separately or be disconnected. The contacts belong to the relays which are connected to the coils of the magnetic scanning heads of device 13 as described above. Thus, the commands which are contained in the respective traces of the magnetic tape are converted into electrical signals by means of resistances in circuit 86 that are either switched in or switched out. These electrical signals influence the electron beam in the desired way through appropriate biasing of an electrode situated directly behind the cathode 3.

Figure 7:
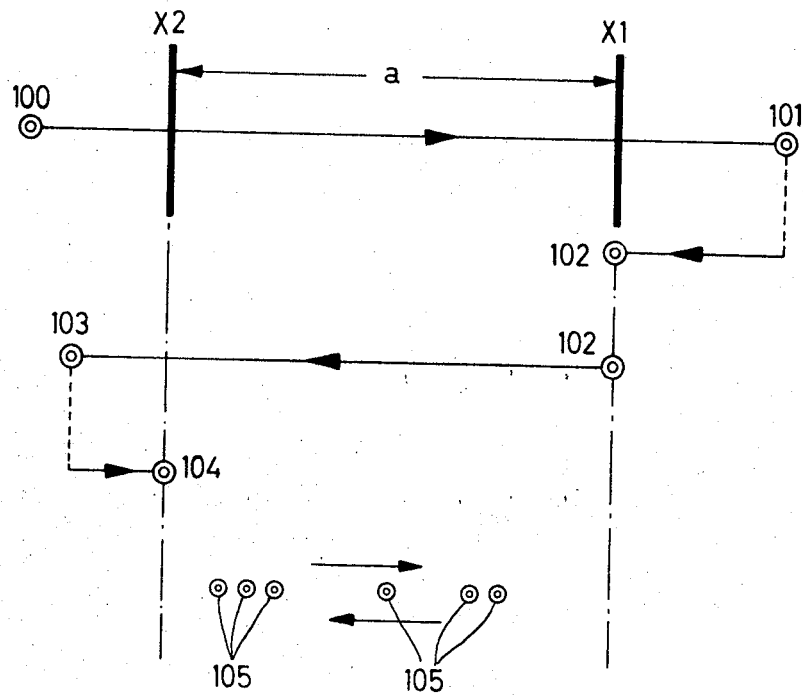
FIG. 7 is a schematic diagram illustrating the path traversed by the corpuscular ray during the precision adjustment of the ray position.

Furthermore, traces are present on the magnetic tape and, correspondingly, relays with contacts which, after the magnetic tape device 13 receives the start command, switch through the switching amplifiers 87 and 88, of amplifier 11 in such a manner that the signals issued by detector 10 and delivered to the switching amplifier 91 can arrive in the control amplifier 14. Also, through the scanning of other traces on the magnetic tape, the bottom contact in device 12, which controls deflection means 8, is close, whereby an excitation circuit for deflection means 8 is now also closed, the excitation circuit containing the voltage source U1 and the position potentiometer 90; this circuit is used to precision adjust the particle beam 4 with respect to the coarsely adjusted specimen 7. The precision adjustment is now obtained by using the reference mark X1 on the specimen (refer to FIG. 7). The position potentiometer is first set so that the resistance looped into the circuit has zero value. This indicates the maximum beam deflection since the entire voltage source U1 is applied to the deflection since the entire voltage source U1 is applied to the deflection means 8. The beam is deflected from its undeflected position 100 in FIG. 7 where the excitation current is zero to position 101 which corresponds to maximum deflection. Thus, the positions indicated in FIG. 7 are practically the impinging points of the beam upon the specimen surface at the various excitation currents.

Starting with position 101 of maximum deflection, because the contact of the switching amplifier 91 has closed the excitation circuit for the control motor 89, the tap of the position potentiometer 90 which is attached to the shaft of the control motor 89 is shifted until the beam sweeps over the reference mark X1. The beam is then in the position designated 102 in FIG. 7 which corresponds to the effected precision adjustment. A signal is now given via the still closed contacts of the switching amplifier 87 and 88. The signal which opens the circuit of the control motor 89 is issued to switching amplifier 91; at the same time a completion signal is received by the tape device 13. The position potentiometer 90 remains in its found position so that the adjustment relating to maximum deflection (point 102) remains in tact.

This is followed by the amplitude correction, that is, the correction of the deflection amplitude which is so effected that the actual deflection amplitude produced by deflection means 8 has the correct magnitude.

Hence, for the purpose of correcting position, the maximum deflection is adjusted through position 102. Commands are now stored on the magnetic tape which are converted by the tape device 13 into switch positions and which provide that the contact of the switching amplifier 88 is moved (with the switching amplifier 87 still closed) into its lowest position in FIG. 6, so that the signals of the detector 10 can act upon the switching device 94 in the control amplifier 15 for amplitude control. Thus, after contact 94 is closed, a circuit for the position motor 92 upon whose shaft the control potentiometer 93 is arranged is also closed. The latter is situated in the circuit of two voltage sources U2 and U3 and in the circuit of the device 12 which determines the deflection amplitudes. The device 12 is constructed in this embodiment according to the circuit of FIG. 6 of the aforementioned Fr. Pat. No. 1,215,825 and provides for a digital control of the deflection amplitude with the aid of the individual resistors, graduated in a specified manner, which can be selectively connected and disconnected by means of individual contacts that are also controlled by the tape device 13. The magnetic tape now issues such commands that the lowest contact (in FIG. 6) is opened in device 12 and the highest resistance is switched in. Starting with position 102 (in FIG. 7) of the corrected maximum deflection, the aforegoing indicates that the beam shifts to position 103, a position of minimum deflection. The beam deflection now has a very low value around which it oscillates during the adjustment of the additional voltage by means of the position potentiometer 93. As soon as the beam deflection is as great as the "corrected" minimum deflection, whereby its point of impingement is determined by position 104, meaning the ray sweeps over reference mark X2, the detector 10 delivers, via the switching amplifier 87 and 88, a signal which opens the switching device 94, so that the potentiometer 93 retains the position provided for point 014. This also determines the maximum deflection in X-direction The magnetic band now issues a command to device 13 that opens the switching amplifier 87 and this concludes the correction process.

Generally, a correction must subsequently be effected with respect to the relative position of specimen and particle beam as well as to the deflection amplitude in Y-direction which is vertical to the X-direction These devices are identical with those described in FIGS. 6 and 7.

Following the above, the deflection of the particle beam will now be effected in correspondence to the commands stored in the magnetic band which are converted into positions of the contacts within device 12. This can be defined by points 105 in FIG. 7, which are situated within the operating region *a* between the two reference marks X1 and X2.

A synchronous operation of several devices is achieved in a simple manner by using a magnetic tape as a command memory by providing a group of traces on the tape for one of the devices. The synchronism is maintained through the use of a single common moving carrier.

To those skilled in the art it will be obvious upon a study of this disclosure that my invention permits of various modifications and may be given embodiments other than particularly illustrated herein, without departing from the essential features of the invention and within the scope of the claims annexed hereto.

We claim:

1. A particle beam apparatus for treating an object at a region thereof with a particle beam, the object being placeable in a plane transverse to the beam, said apparatus comprising a beam generator for providing a particle beam, focusing means and deflecting means for respectively focusing the beam at the plane of the object to be treated and for deflecting the beam to control the path of travel thereof, shiftable table means for supporting an object which is to be treated in the object plane and for moving the object transversely with respect to the beam to an extent which will provide coarse adjustment for the position of the object with respect to the beam whereat the object is treated by the beam to be provided with reference marks, and detector means for detecting the position of said reference marks after said coarse adjustment, said detector means providing a reference as to the position of the object relative to the beam resulting from said coarse adjustment, said detector means providing a signal to said deflection means to finely adjust the position of the beam relative to the region of the object to be treated with the beam.

2. The apparatus of claim 1 comprising deflection control means connected to said deflection means and said detector means for exciting said deflection means to deflect the beam to act upon the object with a treating area defined by the area of the object scanned by said beam in the plane of the object.

3. The apparatus of claim 1 wherein a plurality of regions of an object are treated sequentially by the beam to produce respective systems at these regions, said apparatus comprising adjustment means operatively connected to said table for coarsely adjusting said table to position each region with respect to the beam.

4. The apparatus of claim 1 including a plurality of beam sources providing a corresponding plurality of particle beams, a plurality of said focusing means and a plurality of said deflection means acting on corresponding ones of said beams, said table means including transport means for moving an object so as to locate a region of the object sequentially at a plurality of operating stations at which respective beams from said sources impinge, said table means being shiftable for coarsely adjusting the relative positions of the respective beams and said region of the object.

5. The apparatus of claim 4 wherein the region of the object is treated by a first one of said beams to provide the region with said reference marks, a plurality of said detector means at corresponding ones of said operating stations for detecting the position of said reference marks at said operating stations after said coarse adjustment at each station, each of said detector means providing a reference as to the position of the object relative to the beam resulting from said coarse adjustment and providing a signal to the corresponding one of said deflection means to fine adjust the position of the beam relative to the region of the object to be treated with the beam.

6. The apparatus of claim 5 comprising a plurality of supply current circuits for providing respective currents to corresponding ones of said deflecting means, and said plurality of detecting means having respective signal outputs connected to corresponding ones of said current supply circuits.

7. The apparatus of claim 5 wherein the initial treatment step provides a plurality of said reference marks, each one of said plurality of detector means including detectors for providing signals corresponding to the lateral and angular positions of the reference marks after coarse adjustment by said table means for subsequent treatment steps.

8. The apparatus of claim 5, and wherein the initial treatment step provides a plurality of said reference marks, each one of said plurality of said detector means including at least one detector for obtaining from said reference marks a signal determining the amplitude of deflection provided by the corresponding one of said deflecting means.

9. The apparatus of claim 5 wherein each of said plurality of detector means provides a signal determining the cross section of the beam determined by an image-forming lens means of a corresponding one of said plurality of focusing means.

10. The apparatus of claim 1 including a plurality of beam sources providing a corresponding plurality of beams at respective treating stations and wherein said reference marks are applied sequentially at the first of said stations to each of a plurality of objects, a plurality of said detecting means being disposed at said stations respectively, a plurality of said deflecting means arranged with respect to the paths of the beams respectively, and said table means including means for simultaneously shifting said objects which are treated with corresponding ones of the beams from one station to the next while said plurality of detector means coact with said reference marks at said stations respectively for providing corresponding references as to the respective positions of said objects relative to the corresponding beam, said plurality of detector means providing respective signals indicative of the respective positions of said objects to corresponding ones of said plurality of deflecting means for fine adjustment of the beams respectively, said table means supporting the several objects which are simultaneously treated at the several stations at a predetermined distance one from the next and advancing the objects through said distance from one station to the next.

11. The apparatus of claim 10 wherein reference marks are provided on an object at the first treating station each one of said plurality of deflection means including means for scanning the reference marks with the beams at the subsequent treating stations after the next-following coarse adjustment of said table means.

12. The apparatus of claim 13 wherein said table means includes a frame carrying rollers on which an endless conveyor belt is carried and guided, said belt carrying the several objects which are simultaneously treated and being advanced through increments which will simultaneously displace the objects from one station to the next.

13. In a method for treating an object situated in a given object plane in a particle beam device where a beam of said rays is focused on the object at the object plane, the steps of moving the object transversely with respect to the beam in the object plane to achieve a coarse adjustment of the relative positions of the beam and the object, then treating the object with the beam to apply reference marks thereon, detecting the location of the reference marks, deriving from the detection of the location of the reference marks signals for deflecting the beam and, in response to these signals, deflecting the beam with respect to the coarsely adjusted object to achieve a fine adjustment of the relative positions of the beam and the object.

14. In a method as recited in claim 13, wherein the object to be treated in a mask which coacts with the beam for providing a stencil for subsequent manufacture of systems on other objects at reduced size.

* * * * *